US005511293A

United States Patent [19]
Hubbard, Jr. et al.

[11] Patent Number: 5,511,293
[45] Date of Patent: Apr. 30, 1996

[54] LEASH FOR FISHING RODS

[76] Inventors: Richard T. Hubbard, Jr., S. 19606 Cheney Plaza Rd., Cheney, Wash. 99004; Richard P. Beaty, 46966 McGuire Rd., Sardis, B.C., Canada, V2R 1V1

[21] Appl. No.: 397,888

[22] Filed: Mar. 3, 1995

[51] Int. Cl.$^6$ .......................... A44B 18/00; A01K 87/00; A01K 97/00
[52] U.S. Cl. .......................... 24/442; 24/306; 24/16 PB; 43/25; 119/797
[58] Field of Search .......................... 43/25, 25.2, 21.2; 24/16 PB, 442, 306, 908, 115 R, 129 A, 115 H, 129 R, 304; 119/795, 797, 793, 792; 224/103, 922, 901

[56] References Cited

U.S. PATENT DOCUMENTS

| | | | |
|---|---|---|---|
| 299,179 | 5/1884 | Sweet | 24/115 R |
| 2,458,489 | 1/1949 | Hallander | 119/793 |
| 2,760,700 | 8/1956 | Lien | 43/55 |
| 3,040,477 | 6/1962 | June | 24/115 R |
| 3,095,663 | 7/1963 | Miller | 43/21.2 |
| 3,154,274 | 10/1964 | Hillcourt | 248/42 |
| 3,358,399 | 12/1967 | Waldmann | 43/21.2 |
| 3,851,916 | 12/1974 | Quartullo | 297/188 |
| 3,994,048 | 11/1976 | Rosenthal | 24/81 SK |
| 4,120,437 | 10/1978 | Hara | 224/45 |
| 4,640,039 | 2/1987 | O'Neill | 43/21.2 |
| 4,759,963 | 7/1988 | Uso, Jr. et al. | 428/100 |
| 4,801,136 | 1/1989 | Askins | 24/129 R X |
| 4,817,323 | 4/1989 | Braid | 43/21.2 |
| 4,856,149 | 8/1989 | Brame | 24/3 A |
| 4,862,563 | 9/1989 | Flynn | 24/442 |
| 4,878,585 | 11/1989 | Orestano | 211/87 |
| 4,937,920 | 7/1990 | Tsai | 24/3 C |
| 4,958,758 | 9/1990 | Tipple et al. | 24/306 X |
| 4,989,811 | 2/1991 | Millis et al. | 248/104 |
| 5,008,987 | 4/1991 | Armour, II | 24/442 |
| 5,020,192 | 6/1991 | Gerlach | 24/115 R X |
| 5,026,089 | 6/1991 | Grimmonpre | 280/655 |
| 5,075,933 | 12/1991 | Kemper | 24/16 R |
| 5,075,934 | 12/1991 | Osedo | 24/16 R |
| 5,082,156 | 1/1992 | Braun | 224/901 X |
| 5,104,076 | 4/1992 | Goodall, Jr. | 248/205.2 |
| 5,130,899 | 7/1992 | Larkin et al. | 362/32 |
| 5,131,118 | 7/1992 | Breeher | 24/306 |
| 5,142,743 | 9/1992 | Hahn | 24/16 R |
| 5,167,050 | 12/1992 | Korsen | 24/16 R |
| 5,214,874 | 6/1993 | Faulkner | 43/25.2 |
| 5,237,769 | 8/1993 | Navarro | 43/21.2 |
| 5,289,619 | 3/1994 | Pileggi | 24/306 |

*Primary Examiner*—Richard K. Seidel
*Assistant Examiner*—Jeanne M. Elpel
*Attorney, Agent, or Firm*—Wells, St. John, Roberts, Gregory & Matkin

[57] ABSTRACT

A leash is described for attachment between an article such as a fishing rod and a relatively stationary surface. The leash includes an elongated elastic member resiliently stretchable between first and second member ends. A strap connector is provided at the first end, adapted to be wrapped about and attached to an article such as a fishing rod. A clip is provided at the second end of the elongated elastic member. A keeper including a pair of elastic member receiving apertures is oriented transversely to the elastic member and is mounted along the member length between the first and second ends. The elastic member is slidably threaded through both elastic member receiving apertures. A clip anchor point is also provided on the keeper. The keeper is selectively adjustable along the length of the elastic member at selected distances from the second end. The clip is attachable at the anchor point to form a doubled section attachable to the relatively stationary surface along the elastic member between the keeper and clip. The length of the doubled section is variable with selective adjustment of the keeper along the length of the elastic member to correspondingly vary the overall length of the leash and resistance to tension along the leash between the relatively stationary surface and the strap connector.

16 Claims, 4 Drawing Sheets

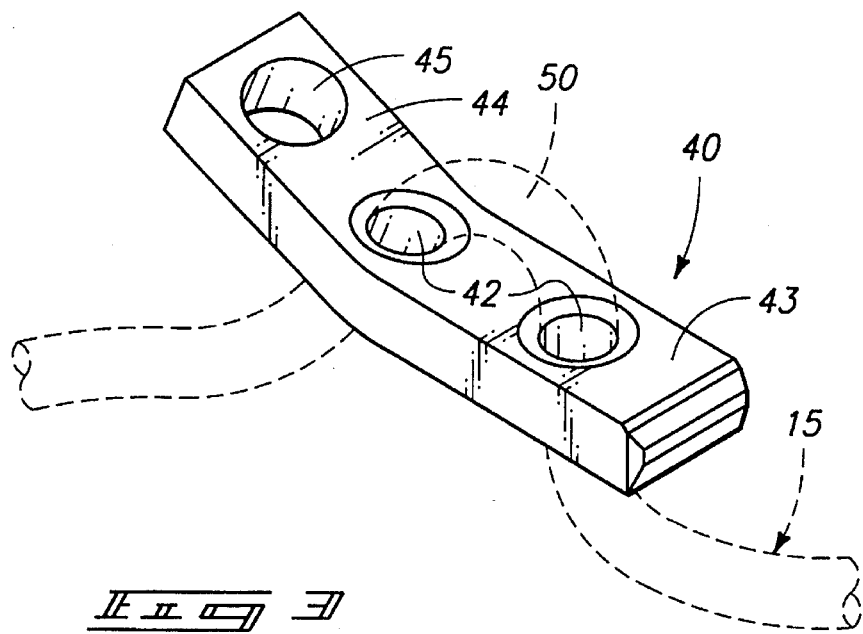
FIG 3
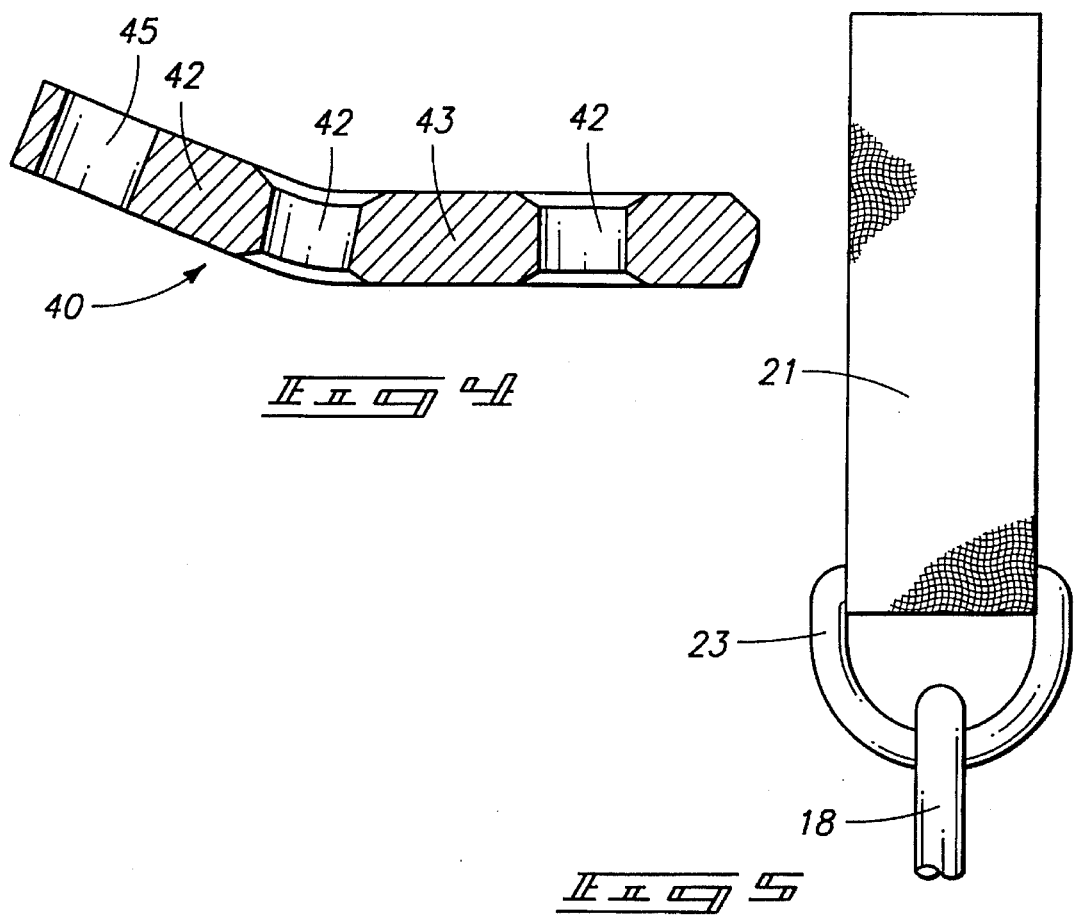
FIG 4
FIG 5

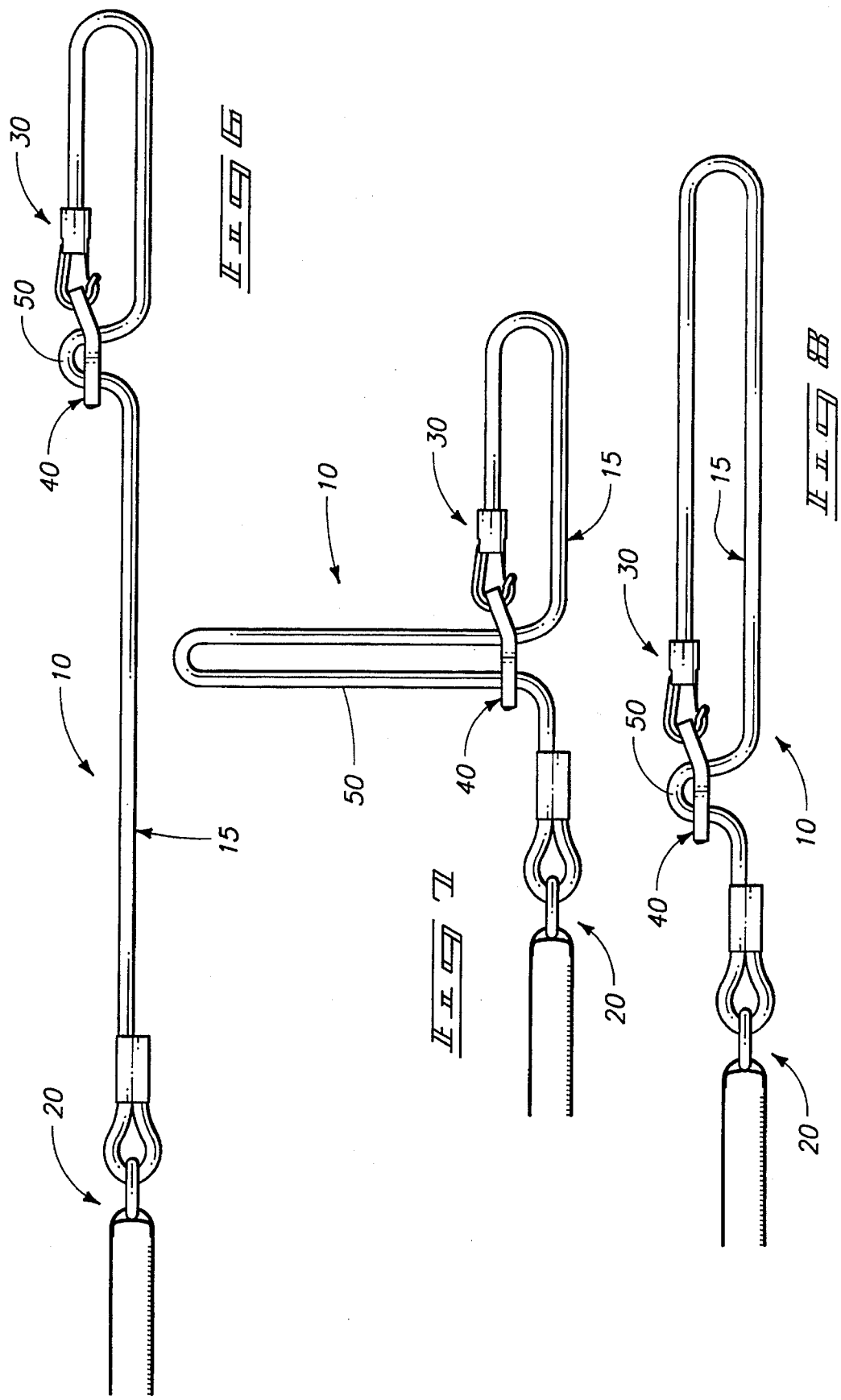

LEASH FOR FISHING RODS

TECHNICAL FIELD

The present invention relates to connection of an article such as a fishing rod to a relatively stationary surface to prevent the article from being inadvertently lost.

BACKGROUND OF THE INVENTION

Many anglers have suffered the double disappointment of loosing a large fish and a prized fishing rod by untimely laying the rod down before the fish strikes. Similar problems also plague other sportsmen who are prone to loosing articles in the water, canoe paddles being a prime example.

A need is therefor realized for some form of device for tethering the article to a relatively stationary surface, such as the gunnel of a boat, a float tube, the owner's clothing, or the like.

Indeed, various forms of leash devices have been developed that do solve the problem of loss of the article. However, such leash devices typically make use of a non-elastic strap or cable which can do damage to the attached article when the length of the tether runs out and the article is pulled between the relatively stationary surface and the cause of the tensioning force.

Further, in the case of fishing, a non-extensible strap or cable will typically jerk the hook from the mouth of a striking fish, or will abruptly halt motion of the attached fishing rod and cause the fishing line to break, loosing the fish, line, and bait in the process.

A need therefor has remained for a leash device that will not only save the article from being lost, but that will also function to avoid damage to the article and loss of the connection between the article and the tension producing force (a fish, for example).

The present invention fills the above need and adds still other advantages which will be readily understood from the following description and accompanying drawings.

BRIEF DESCRIPTION OF THE DRAWINGS

Preferred embodiments of the invention are described below with reference to the accompanying drawings, which are briefly described below.

FIG. 3 is a perspective view of a preferred keeper for the present leash device, with a fragmented portion of the attached elastic member being shown by dashed lines;

FIG. 4 is a longitudinal sectional view through the keeper;

FIG. 5 is a fragmented view of a preferred connector of the present invention;

FIG. 6 is an elevational view of the preferred leash device set at a first effective length;

FIG. 7 is a view showing an intermediate step in adjustment of the leash length; and FIG. 8 is an elevational view similar to FIG. 6, only showing a second effective length of the leash device.

DETAILED DESCRIPTION OF THE PREFERRED EMBODIMENTS

Figure 1:
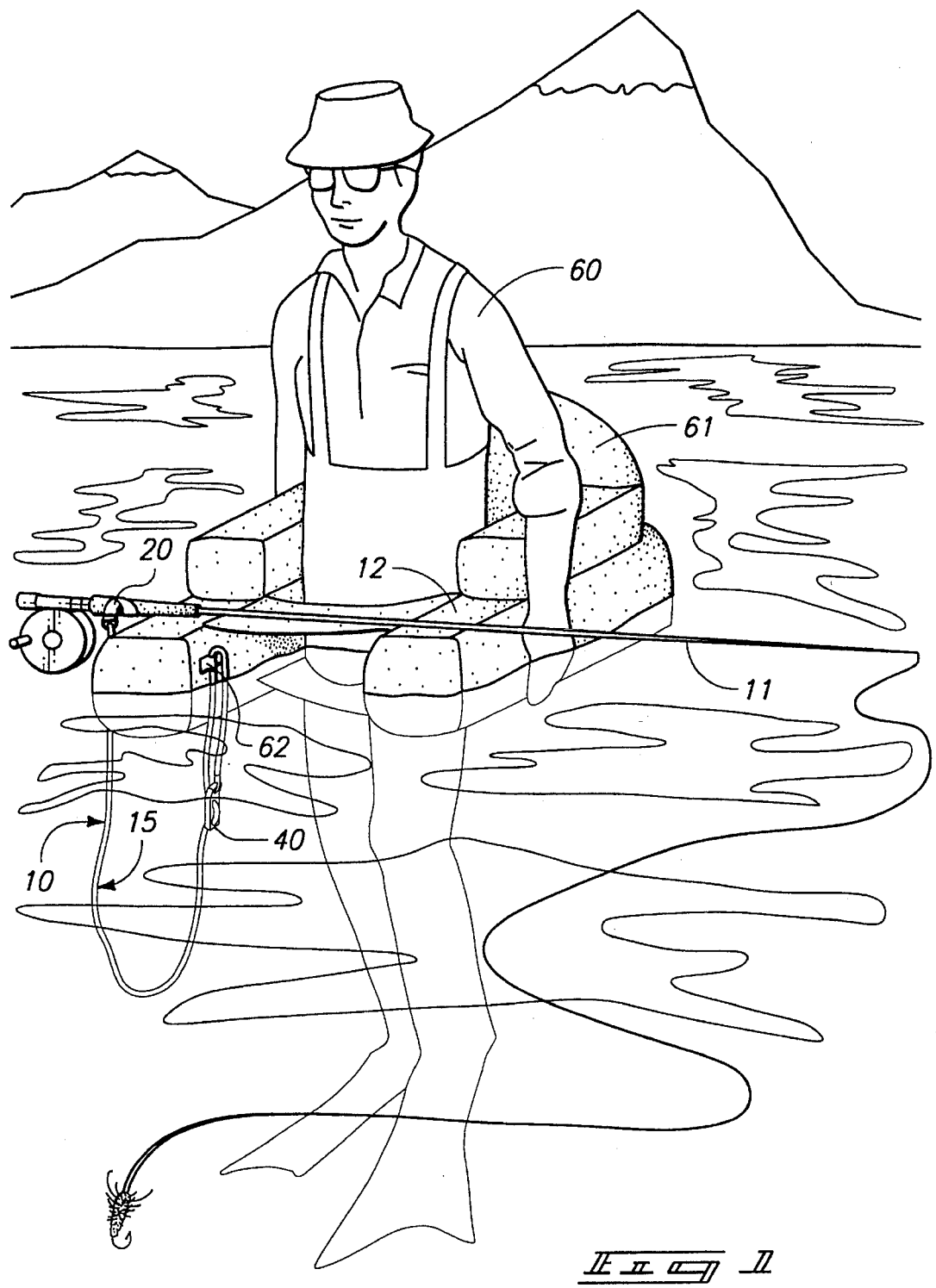
FIG. 1 is a perspective view of a first preferred form of the present invention in use by an angler.

This disclosure of the invention is submitted in furtherance of the constitutional purposes of the U.S. Patent Laws "to promote the progress of science and useful arts" (Article 1, Section 8).

A preferred form of the present leash is shown in the drawings and is designated therein by the reference numeral 10. The leash 10 is intended for attachment between an article such as a fishing rod 11 (FIG. 1) and a relatively stationary surface 12, such as the float tube also shown in FIG. 1. It should be understood, however that other relatively stationary surfaces might be used, and that the leash 10 could be connected to articles other than fishing rods. The leash, for example would function equally as well tethering a canoe paddle to a canoe, a camera to a photographer, a tool to a tool belt, etc.

The leash 10 includes an elongated elastic member 15 that may be of varying length and thickness dimension, depending upon the intended use. The common feature to all such forms of members is that they are all elastic along their lengths. The term "elastic" should be taken to mean flexible and resilient under tension.

In a preferred form, the elastic member 15 is formed of a stretchable material such as rubber. The material commonly used for "bungee" cords is preferred and can be supplied in lengths and thickness dimensions according to the need of the user.

Figure 2:
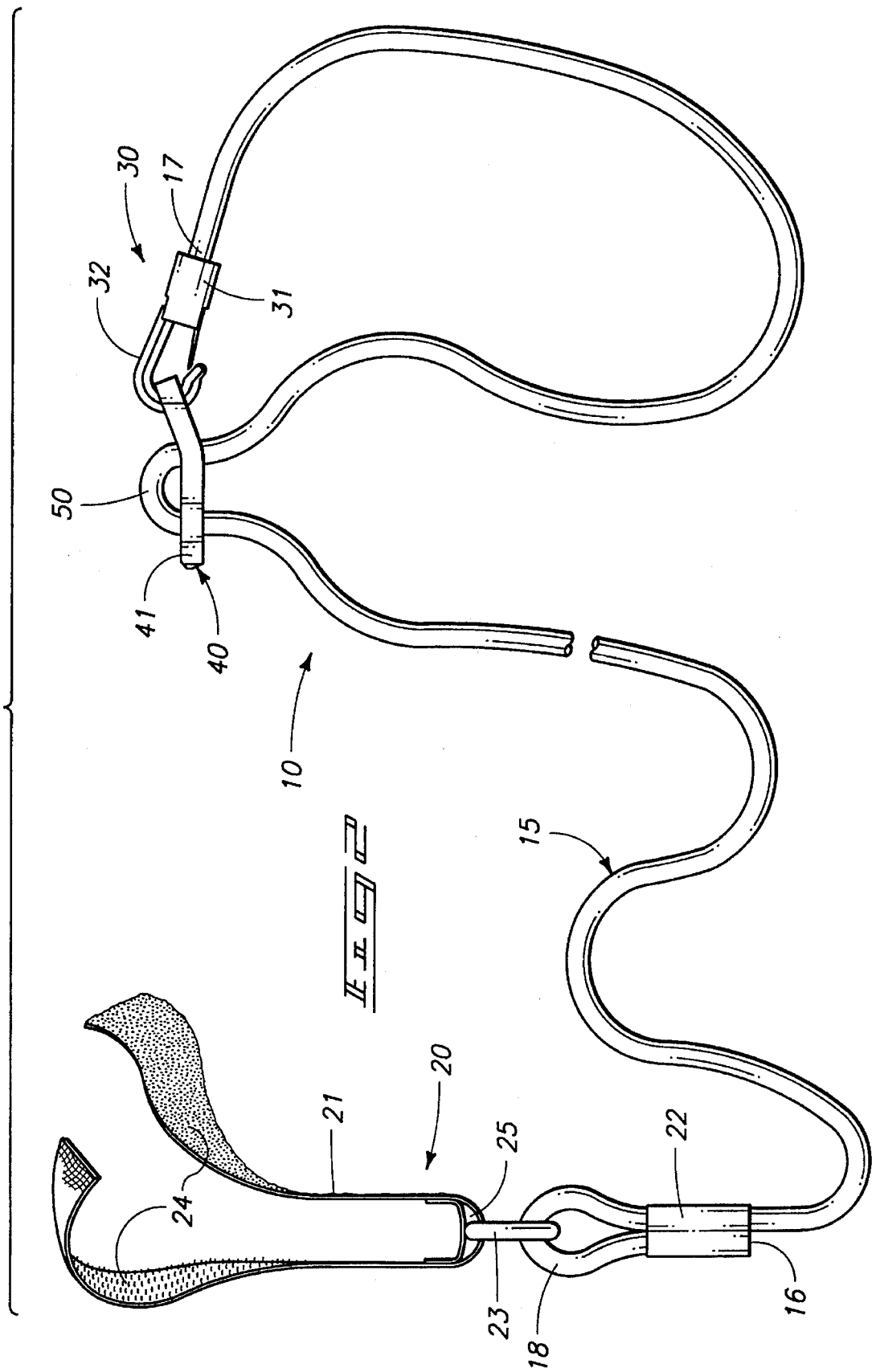
FIG. 2 is a partially fragmented view of a preferred form of the present leash device.

The elastic member 15 extends a selected distance between a first end 16, and a second end 17 (FIG. 2). The first end 16 mounts a connector 20, and the second end mounts a clip 30. A keeper 40 is mounted to the member 15 intermediate the ends 16, 17, and includes an anchor point for releasably attaching the clip. A single length of the elastic member 15 thus extends from one side of the keeper 40 to the connector 20. A doubled section of the member 15 extends to the opposite side of the keeper 40, when the clip 30 is attached to the anchor point.

The connector 20, in a preferred form, is comprised of a strap 21 mounted to the elastic member 15 at its first end 16. To accomplish this, the elastic member 15 is doubled over to form a loop 18, using ferrule 22 that is swaged, glued or otherwise attached securely to the first end 16. A "D" ring 23 (FIGS. 2, 5) is held in the loop 18, formed of plastic or other appropriate material.

The strap 21 is formed of strong, flexible material, such as nylon, rayon, or other appropriate strong, flexible material, with fasteners 24 on opposite sides of the strap ends. It is preferred that the strap length be such that it will easily wrap at least once about the article to be attached.

In a preferred form, the fasteners 24 are of the hook and loop variety, such as Velcro brand fasteners. Such fasteners 24 are flexible with the strap material and may be used to fasten the strap ends together once the strap is wrapped about an article such as the fishing rod 11 shown in FIG. 1. They may be sewn, glued or otherwise permanently affixed to the strap 21. It is preferred that the fasteners be of substantial length along the strap 21 to accommodate articles of different size.

An eye 25, is formed at the approximate center of the strap to receive the "D" ring 23. The eye 25 may be formed of the same material as the strap 21 and is sewn or otherwise securely attached thereto.

The strap 21, "D" ring 23, and the loop 18 at the first end 16 of the elastic member 15 are arranged for flexibility, allowing the present leash 10 to be secured to a variety of articles. The strap shown, for example could be wrapped about a number of different fishing rods of various sizes and types.

The clip 30, as briefly described above, is preferably of a snap ring form, for releasable attachment to the keeper 40.

It is secured by a ferrule 31 that is swagged, glued, or otherwise secured to the second end 17 of the elastic member 15. A hook and spring clasp assembly 32 extends axially from the ferrule 41.

The clip elements may be formed entirely of plastic or, in forms where additional strength is required, of metal. In either instance, the clip 30 may be a conventional "off-the-shelf" item commonly available in hardware stores.

The keeper 40 is threaded onto the elastic member 15 between the first and second ends 16, 17. It is used to vary the overall length of the leash 10, and to vary the amount of tension required to stretch the elastic material.

The keeper 40, in a preferred form, is comprised of an elongated rigid body 41. In one preferred form the body 41 is formed of aluminum, but could also be formed of a strong plastic, or other appropriate metal.

Keeper 40 (FIGS. 3, 4) incudes a pair of apertures 42 extending through the body 41 to slidably receive the elastic member 15. The apertures 42 are advantageously flared at their open outward ends to avoid chafing the elastic member 15.

Apertures 42 are preferably substantially parallel to one another, and angularly offset from the elastic member 15. The terms "substantially parallel" and "angularly" should be considered broadly, since the axes of the apertures could slightly converge toward one side of the keeper 40. Further "angularly" should be understood to include angles of the aperture axes that are not parallel to the elastic member 15.

The size or diameters of the apertures 42 are to be slightly larger than the cross-sectional dimension of the elastic member 15. Such slightly oversized apertures allow the keeper 40 to slide, when being adjusted, along the elastic member 15.

Once set, the keeper 40 will remain stationary on the member 15 to provide a stationary anchor for the clip 30 until readjustment is desired.

The member 15 is threaded through the apertures 42 in the manner shown in the drawings, in a "weave" extending from a first side of the keeper, through one of the apertures 42 to the second side of the keeper, and thence from the second side of the keeper through the other one of the apertures back to the first side.

Thus the member 15 forms a bight 50 on the second side of the keeper. When the member 15 is drawn taut to set the keeper 40 at a desired position, the bight 50 is drawn up against the keeper. The angular orientation of the apertures 42, and the tension of the member 15, attempting to return to a straight line orientation, serve to securely hold the keeper 40 in place at any desired location along the member 15 between the first and second ends 16, 17. The keeper 40 will not move along the member 15 until the bight 50 is loosened.

In one preferred form, the keeper 40 includes a first section 43, including the paired apertures 42, and a second section 44 that is angularly oriented or bent in relation to the first section. The angularly oriented second section 44 includes an anchor point 45, preferably comprised of a third aperture formed through the keeper 40 to releasably receive the clip 30.

The second section 44 is angular so that when tension is applied through the attached clip 30 (as when the elastic member 15 is drawn taut), the keeper 40 will be canted angularly binding the paired apertures 42 against the elastic member 15, further securing the keeper 40 in position along the member 15.

Given the above description of the invention, operation may now be easily understood. Such description will be given with reference to use of the device on a fishing rod, in the situation shown in FIG. 1. However, it should understood that such description is exemplary, and that use can vary with the nature of the article and relatively stationary surface being used.

The setting for use of the present leash 10, as shown in FIG. 1 involves a fly fisherman 60 in a float tube 61. He has placed his fishing rod 11 across the tube 61 to free his hands for adjusting his position in the tube.

To assure that the fishing rod will not be lost to a striking fish, the fisherman has connected the fishing rod 11 (article) to a relatively stationary surface (the float tube 61) by means of the present leash 10. This is accomplished by winding the connector strap 21 about the hand grip of the rod and connecting the fasteners 24. The first end of the leash 10 is thus secured to the fishing rod 11.

Next, the fisherman secures the second end of the leash 10 to an appropriate part of the float tube 61, such as the loop 62 shown. This is accomplished by first releasing the clip 30 from the keeper 40. The released keeper is then threaded through the float tube loop 62. Now the clip 30 can be re-attached to the keeper, thereby securing the leash 10 to the float tube 61 and forming the doubled section of the elastic member.

The fisherman may now adjust the overall length of the leash 10 as desired, according to the fishing conditions. If it is desired to lengthen the leash, the keeper 40 is slidably adjusted along the member 15 by pulling the bight 50 loose (as shown in FIG. 7) from the clip 30 side of the keeper, and by subsequently pulling the loose bight back through the keeper 40 from the connector 20 side of the keeper. This effectively lengthens the leash 10 (FIG. 6).

If a shorter leash is desired, the bight 50 is similarly loosened, but the slack is pulled from the clip 30 side of the keeper, lengthening the doubled section of the member 15 between the keeper 15 and float tube loop 62 (FIG. 8).

An advantage gained through the above arrangement is that the resistance to stretching along the leash length is decreased when the leash is lengthened and increased when the leash is shortened. This is a function of the doubled section length of the member from the keeper 40 to the clip 30 (when attached to the keeper 40) and the single length of the member 15 between the keeper 40 and the connector 20.

When the keeper 40 is adjusted toward the connector 20, the doubled section of the member 15 between the keeper and loop 62 is increased in length relative to the single span from the keeper 40 to the connector 20 (FIG. 8). Hence the overall resistance to stretching is increased.

When the doubled section of the member 15 is decreased in length relative to the longer single span from the keeper 40 to the connector 20, the overall resistance to stretching is decreased.

With the above features in mind, the angler may wish to shorten the overall length of the leash when large fish are expected to be encountered. The firmer, short leash (FIG. 8) will function to properly set the hook if the fishing rod is pulled from its resting place on the tube by a large fish.

However, the shortened leash will not stretch from the pull of a smaller fish and could jerk the hook from its mouth. So, if smaller fish are expected to be encountered, the length of the leash should be increased (FIG. 6). This is done to lessen the stretching resistance and offer an opportunity for the leash to properly set the hook in the mouth of the smaller fish.

It is noted that at any leash length setting, long or short, the keeper will remain in its adjusted position. This is a function of the keeper, gripping and crimping the member 15 when the bight 50 is pulled tight.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A leash for attachment between an article and a relatively stationary surface, comprising:

an elongated elastic member including first and second ends;

a connector at the first end adapted to be attached to said article;

a clip at the second end;

a keeper including a pair of elastic member receiving apertures and a clip anchor point;

wherein the keeper is mounted to the elastic member between the first and second ends, with the elastic member being slidably threaded through both elastic member receiving apertures;

the keeper being selectively adjustable along the length of the elastic member at selected distances from the second end;

wherein the clip is attachable to the clip anchor point to double a section of the elastic member between the keeper and clip, which section is of an adjustable length for attachment to the relatively stationary surface.

2. A leash, as claimed by claim 1, wherein the keeper includes an elongated rigid body, and wherein the pair of apertures are formed through the body along substantially parallel axes.

3. A leash, as claimed by claim 1, wherein the anchor point is comprised of a third aperture formed through the keeper for engagement by the clip.

4. A leash, as claimed by claim 1, wherein the keeper is formed of an elongated rigid body including a first section, and a second section angularly inclined with respect to the first section and wherein the pair of apertures are formed through the first section.

5. A leash, as claimed by claim 1, wherein the keeper is formed of an elongated rigid body including a first section, and a second section;

wherein the pair of apertures are formed through the body in the first section and the anchor point is situated at the second section, spaced from the pair of apertures.

6. A leash, as claimed by claim 1, wherein the keeper is formed of a rigid elongated body extending between opposed ends and having a bend between the ends forming an angularly offset section; and wherein the anchor point is situated along the angularly offset section.

7. A leash, as claimed by claim 1, wherein the elastic member is resilient along its full length.

8. A leash, as claimed by claim 1, wherein the connector is comprised of a strap mounted to the elastic member at its first end; and fastening members on the strap enabling the strap to be wrapped about and fastened to said article.

9. A leash, as claimed by claim 1, wherein the connector is comprised of a strap mounted to the elastic member at its first end; and wherein the strap includes hook and loop fasteners enabling the strap to be wrapped about and fastened to an article.

10. A leash, as claimed by claim 1, wherein the connector is comprised of:

a "D" ring mounted to the elastic member at the first end thereof;

a strap mounted to the "D" ring; and wherein the strap includes ends with fasteners positioned on the strap to enable the strap to be wrapped about said article and the fasteners to be secured together to secure the strap to the article.

11. A leash, as claimed by claim 1, wherein the clip is a snap ring, and wherein the anchor point is defined by a third aperture formed through the keeper to receive the snap ring and spaced from the pair of apertures.

12. A leash for attachment between an article and a relatively stationary surface, comprising:

an elongated elastic cord including first and second ends;

a "D" ring mounted to the elastic cord at the first end thereof;

a connector mounted to the "D" ring, adapted to be attached to said article;

a clip at the second end of the elastic cord;

a keeper including a pair of elastic member receiving apertures oriented angularly in relation to the elastic cord the keeper further including a clip anchor point spaced from the pair of elastic member receiving apertures;

wherein the keeper is mounted to the elastic member between the first and second ends, with the elastic member being slidably threaded through both apertures;

wherein the clip is releasably attachable to the anchor point to double the elastic member on one side of the keeper;

the keeper being selectively adjustable along the length of the elastic member at selected distances from the second end.

13. A leash as claimed by claim 12, wherein the connector is comprised of a flexible strap mounted to the "D" ring; and hook and loop fasteners on the flexible strap.

14. A leash as claimed by claim 12, wherein the anchor point is comprised of a third aperture formed through the keeper for engagement by the clip.

15. A leash as claimed by claim 12, wherein the anchor point is comprised of a third aperture formed through the keeper for engagement by the clip; and wherein the clip is comprised of a snap ring releasably receivable through the third aperture.

16. A leash for attachment between an article and a relatively stationary surface, comprising:

an elongated elastic member including first and second ends and resiliently stretchable between said first and second ends;

a strap connector at the first end adapted to be wrapped about and attached to said article such as a fishing rod;

a clip at the second end of the elongated elastic member;

a keeper including a pair of elastic member receiving apertures oriented transversely to the elastic member, and a clip anchor point;

wherein the keeper is mounted to the elastic member between the first and second ends, with the elastic member being slidably threaded through both elastic member receiving apertures;

the keeper being selectively adjustable along the length of the elastic member at selected distances from the second end;

wherein the clip is attachable to the clip anchor point to form a doubled section along the elastic member between the keeper and clip, of an adjustable length for attachment to the relatively stationary surface, the length of the doubled section being variable with selective adjustment of the keeper along the length of the elastic member to correspondingly vary the overall length of the leash and resistance to tension along the leash between the relatively stationary surface and the strap connector.

* * * * *